March 10, 1959  T. J. O'DONNELL  2,876,867
BRAKE DEVICE
Filed Nov. 21, 1946  2 Sheets-Sheet 2
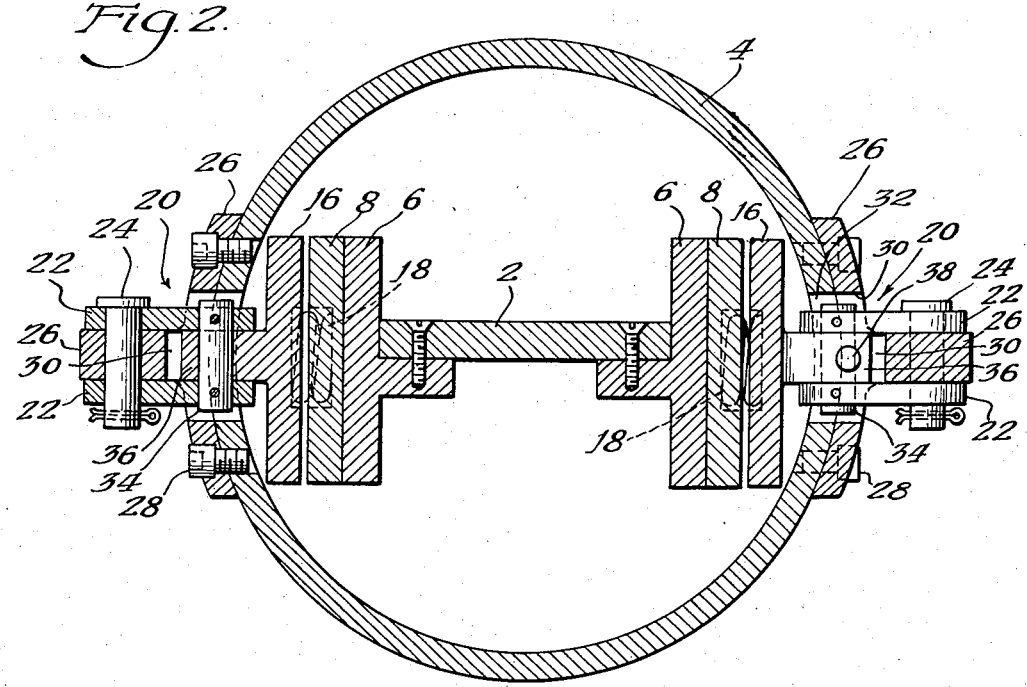
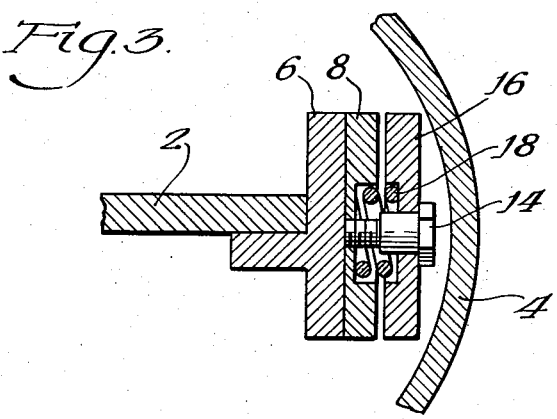
INVENTOR.
Thomas J. O'Donnell
BY

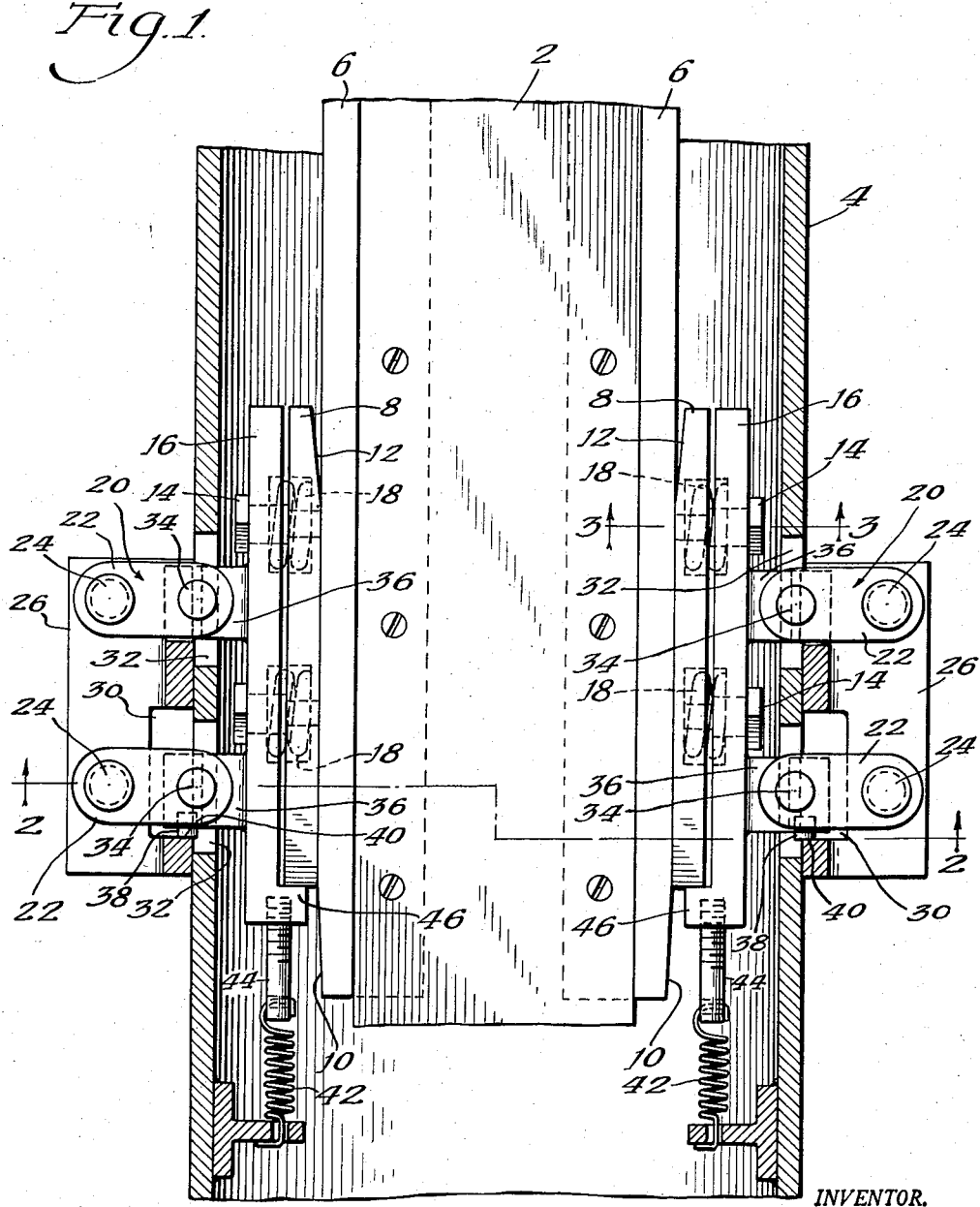

United States Patent Office 2,876,867

Patented Mar. 10, 1959

2,876,867

BRAKE DEVICE

Thomas J. O'Donnell, Chicago, Ill., assignor to the United States of America as represented by the United States Atomic Energy Commission Application November 21, 1946, Serial No. 711,408

12 Claims. (Cl. 188—67)

This invention relates to brake devices and more particularly to a novel brake or snubbing device adapted for utilization in connection with neutronic reactors, as for example in braking control members such as emergency control rods which are urged into such a reactor at high speed to rapidly terminate the nuclear fission chain reaction therein.

A general object of the invention is to design a simple and economical brake or snubbing device for the purpose above described, which device is capable of withstanding the impact of an associated control rod as the latter is urged into the reactor.

Another object of the invention is to provide novel means for releasing the brake device as the control rod is withdrawn therefrom.

Still another object of the invention is to design a device such as above described wherein the brake shoes which engage the control rod are supported by parallelogram link mechanisms provided with novel means to hold said mechanisms substantially in the rectangular positions thereof as the control rod is urged into the brake device and engages the shoes, said means being yielding to accommodate movement of said mechanisms out of the rectangular positions thereof as the control rod is withdrawn.

The foregoing and other objects and advantages of the invention will become apparent from a consideration of the following specification and the accompanying drawings wherein:

Fig. 1 is a side elevation partly in vertical section of a novel brake device embodying the invention;

Fig. 2 is a sectional view taken in the planes indicated by the line 2—2 of Fig. 1; and Fig. 3 is a fragmentary sectional view taken in the plane indicated by line 3—3 of Fig. 1.

Describing the invention in detail, the control rod generally designated 2 is reciprocal within a conduit 4 illustrated in the shape of a tube and extending downwardly into an associated neutronic reactor not shown.

The rod 2 may operate in any desired plane and may be actuated by any suitable mechanism (not shown), or if desired may be urged downwardly by force of gravity as will be readily understood by those skilled in the art. A friction plate or a shoe 6 is preferably secured to each side of the rod 2 to afford a relatively large friction face or surface adapted for engagement with an associated friction shoe 8. As will be seen in Fig. 1 the plates 6 taper downwardly as indicated at 10 and the shoes 8 taper upwardly as indicated at 12 to facilitate entrance of the rod 2 between the shoes 8 as the rod moves downwardly for braking engagement with the shoes as hereinafter discussed. Each shoe 8 is threadedly engaged with bolts 14, each of which is slidingly fitted in an opening through a backing plate 16, springs 18 being provided to urge the shoe 8 away from the plate 16 into engagement with the adjacent plate 6.

The plate 16 forms one link of a parallelogram link mechanism generally designated 20, said mechanism comprising a pair of upper links 22 pivotedly connected at 24 to a support bracket or link 26 attached to the tube 4 as by stud bolts 28. The bracket 26 is slotted as at 30 to accommodate a pair of lower links 22 also pivoted at 24 to the bracket, and the tube 4 is slotted as at 32 to receive the links 22 which are pivoted as at 34 to lugs 36 formed on the rear face of the backing plate 16.

Thus the bracket 26 forms the fixed link of the parallelogram link mechanism 20 and the plate 16 and links 22 constitute the moveable links of said mechanism. In this connection it may be noted that the bottom lug 36 of each plate 16 is provided wih a preferably adjustable pin 38 connected to the lug as by threaded engagement therewith and adapted to abut the margin of the associated slot 30 as at 40, Fig. 1, to limit downward movement of the plate 16. Thus the associated link mechanism 20 is prevented from moving downwardly out of the rectangular or square position shown in Fig. 1 wherein the inner ends of the links 22 are most closely adjacent the associated plate 6 so as to exert maximum thrust thereagainst by the shoes 8. The mechanism 20 is resiliently maintained in the rectangular position shown in Fig. 1 by a tension spring 42 connected to a pin 44 adjustably threaded into the associated plate 16. Thus it will be understood that as the control rod 2 moves downwardly to the position shown in Fig. 1 whereat the control rod is in its innermost position with respect to the reactor (not shown) therebelow, the shoes or plates 6 engage the shoes 8 compressing the springs 18 which are thus effective to clamp the rod 2 therebetween. At this time downward movement of the links 22 of the parallelogram mechanisms 20 is prevented by the stops 38 so that the springs 18 are effective to exert maximum thrust against the plate 16 thus developing maximum friction at the friction surfaces between the plates 6 and the shoes 8. When it is desired to retract the rod upward as seen in Fig. 1 the springs 42 yield in response to the force exerted thereagainst by upward movement of the plate 16 which is frictionally interlocked by means of the shoe 8 with the adjacent plate 6. Thus the links 22 are pivoted about the pivot points 24 to accommodate upward movement of the plate 16 away from a rod 2. This releases the brake mechanism accommodating upward movement of the rod 2 without substantial frictional resistance by the shoes 8.

It may be noted that each plate 16 is provided with a lug or flange 46 engageable with the bottom of the associated shoe 8 to limit downward movement thereof relative to the plate, thus substantially eliminating bending stresses on the associated springs 18.

It will be understood that the above described embodiment of the invention is merely by way of illustration and not limitation inasmuch as various modifications will be readily apparent to those skilled in the art without departing from the spirit of the invention of the scope of the appended claims.

What is claimed is:

1. A brake device comprising a pair of parallelogram link mechanisms, a member moveable rectilinearly therebetween in opposite directions, and shoes resiliently supported, by said mechanisms for frictional engagement with said member.

2. A brake device comprising a pair of parallelogram link mechanisms, a member moveable rectilinearly therebetween in opposite directions to braked while moving in one direction, shoes resiliently supported, by said mechanisms for frictional engagement with said member, and stop means for limiting movement of said mechanisms out of the rectangular positions thereof in response to force exerted against said shoes by said member while moving in said one direction.

3. A brake device comprising a pair of parallelogram link mechanisms, a member moveable rectilinearly therebetween in opposite directions to be braked while moving in one direction, shoes carried by said mechanisms for frictional engagement with said member, stop means for limiting movement of said mechanisms out of the rectangular positions thereof in response to force exerted against said shoes by said member while moving in said one direction, and resilient means mounting said shoes for yieldingly urging said shoes into engagement with said stop means.

4. A brake device comprising a member to be braked and moveable rectilinearly in opposite directions, spaced brake shoes engageable with opposite sides of said member, a backing element resiliently supporting each shoe, a support structure adjacent each element, a link pivoted to each structure and to the adjacent element, and means for limiting movement of each link in one of said directions only from the position at which the pivotal connection between said link and the related element is closest to said member.

5. A brake device comprising a member to be braked and moveable rectilinearly in opposite directions, spaced brake shoes engageable with opposite sides of said member, a backing element resiliently supporting each shoe, a support structure adjacent each element, a link pivoted to each structure and to the adjacent element, and means for limiting movement of each link in one of said directions only from the position at which the pivotal connection between said link and the related element is closest to said member, and resilient means for urging each link against the related limiting means.

6. A brake device comprising a member to be braked, spaced brake shoes engageable with opposite sides of said member, a backing element resiliently supporting each shoe, a support structure adjacent each element, a pair of links pivoted to each structure and pivoted to the adjacent element to define a parallelogram, and means for limiting movement of said parallelogram from the rectangular position thereof in response to forces exerted thereagainst by said member as the latter moves in one direction, said parallelogram being adapted to move from said rectangular position thereof in response to forces exerted thereagainst by said member while the latter moves in the opposite direction.

7. A brake device comprising a member to be braked and moveable rectilinearly in opposite directions, brake shoes engageable with opposite sides of said member, and support means for at least one of said brake shoes comprising a parallelogram link mechanism associated therewith, stop means for limiting movement of said mechanism out of the rectangular position thereof in one direction, and resilient means for urging said shoes into engagement with said stop means and for accommodating movement of said mechanism out of the rectangular position thereof in the opposite direction.

8. A brake device comprising a member to be braked and moving rectilinearly in opposite directions, brake shoes engageable with opposite sides of said member, and support means for at least one of said brake shoes comprising a parallelogram link mechanism associated therewith, stop means for limiting movement of said mechanism out of the rectangular position thereof in one direction, resilient means urging said mechanism into engagement with said stop means and accommodating movement of said mechanism out of the rectangular position thereof in the opposite direction, and resilient means reacting between said mechanism and the associated shoe for urging the latter against said member.

9. A one direction snubber for an elongated member comprising a pair of elements supporting spring pressed brake shoes spaced from each other to accommodate slideable movement of said member therebetween, support means for each element comprising a pair of parallel arms, each having one end pivotly mounted on an associated support and the other end pivotly connected to said element, and means to prevent the pivoting of said arms in one direction of snubbing beyond the point at which said arms are approximately perpendicular to said member.

10. A one direction snubber for an elongated member comprising a pair of elements and spring pressed brake shoes supported thereby, said shoes being spaced from each other to accommodate slideable movement of said member therebetween, support means for each element comprising a pair of parallel arms, each having one end pivotly mounted on an associated support and the other end pivotly connected to said element, means to prevent the pivoting of said arms in one direction of snubbing beyond the point at which said arms are approximately perpendicular to said member, and resilient means for yieldingly maintaining said arms at said point.

11. A one direction snubber for an elongated member comprising a pair of backing plates at opposite sides thereof, friction shoes resiliently mounted on respective plates for frictional engagement with said member, a support for each plate comprising a stationary member and a pair of links pivotly connected to said member and to said plate to define a parallelogram link mechanism therewith, and means on said plate for engagement with said fixed member to limit movement of said mechanism out of the rectangular position thereof in one direction only.

12. A one direction snubber for an elongated member comprising a pair of backing plates at opposite sides thereof, friction shoes resiliently mounted on respective plates for frictional engagement with said member, a support for each plate comprising a stationary member and a pair of links pivotly connected to said member and to said plate to define a parallelogram link mechanism therewith, stop means carried by said plate for engagement with said fixed member to limit movement of said mechanism out of the rectangular position thereof in one direction only, and a spring reacting against said plate to urge said stop means into said engagement.

References Cited in the file of this patent
UNITED STATES PATENTS

| | | |
|---|---|---|
| 1,293,809 | Kux | Feb. 11, 1919 |
| 1,631,078 | Wellman | May 31, 1927 |